United States Patent [19]

Harris

[11] Patent Number: 5,108,145
[45] Date of Patent: Apr. 28, 1992

[54] APPARATUS AND METHOD FOR MOTOR VEHICLE AIR DRAG REDUCTION USING REAR SURFACE STRUCTURE

[76] Inventor: B. Waylon Harris, 826 E. Harmont Dr., Phoenix, Ariz. 85020

[21] Appl. No.: 687,172

[22] Filed: Apr. 18, 1991

[51] Int. Cl.⁵ .............................................. B62D 35/00
[52] U.S. Cl. ................................ 296/180.1; 296/180.4
[58] Field of Search ............... 296/180.1, 180.2, 180.4; 244/130

[56] References Cited

U.S. PATENT DOCUMENTS

| | | | |
|---|---|---|---|
| 1,903,823 | 4/1933 | Lougheed | 244/130 |
| 2,800,291 | 7/1957 | Stephens | 244/41 |
| 2,899,150 | 8/1959 | Ellis, Jr. | 244/41 |
| 4,180,290 | 12/1979 | Drews | 396/1 S |
| 4,284,302 | 8/1981 | Drews | 296/1 S |
| 4,682,808 | 7/1987 | Bilanin | 296/1 S |
| 4,702,509 | 10/1987 | Elliot, Sr. | 296/1 S |
| 4,776,535 | 10/1988 | Paterson et al. | 244/130 |
| 4,789,117 | 12/1988 | Paterson et al. | 244/130 |
| 4,813,633 | 3/1989 | Werle et al. | 244/130 |
| 4,861,093 | 8/1989 | Chapman | 296/180.1 |
| 4,960,283 | 10/1990 | Gobush | 273/232 |

FOREIGN PATENT DOCUMENTS

| 927616 | 5/1982 | U.S.S.R. | |
| 453086 | 9/1936 | United Kingdom | 296/180.1 |

*Primary Examiner*—Robert R. Song
*Attorney, Agent, or Firm*—Charles E. Cates; William W. Holloway

[57] ABSTRACT

In order to increase energy efficiency by reducing the drag experienced by tractor-trailers, vans, or similar motor vehicles, structure is incorporated in the rear surface or panel of the motor vehicle. The structure is implemented with a multiplicity of cavities or a multiplicity of protruding regions. The cavities or protruding regions each comprise only a small portion of the total area of the rear surface and the depth or extension dimension, relative to the rear surface or panel, is small. The rear surface structure permits convenient access to the interior of the vehicle and can be incorporated in either a rear door assembly or in a sliding rear panel assembly.

17 Claims, 1 Drawing Sheet

APPARATUS AND METHOD FOR MOTOR VEHICLE AIR DRAG REDUCTION USING REAR SURFACE STRUCTURE

BACKGROUND OF THE INVENTION

1. Field of the Invention

This invention relates generally to motor vehicles and, more particularly, to techniques for the reduction of drag by providing the motor vehicle with structure on the rear surface.

2. Description of the Related Art

In the related art, the use of structure associated with rear motor vehicle surfaces has been described. U.S. Pat. No. 4,702,509, issued on Oct. 27, 1987 to Elliott, Sr., describes, inter alia, an inflatable balloon bag member associated with a rear of a tractor-trailer which provides for a streamlining of the vehicle region. The collapsibility of the streamlining member permits convenient storage when access to the rear of the motor vehicle is required and at low vehicle speeds when the streamlining is no longer required. U.S. Pat. No. 4,180,290, issued on Dec. 25, 1979 to Drews, and U.S. Pat. No. 4,284,302, issued on Aug. 18, 1981 also to Drews, describe the use of wave shaped flutes on the surface of a generally streamlined motor vehicle, the flutes generally extending longitudinally at an angle to the direction of travel. The wave shaped flutes are located on the rear portion of the motor vehicle, a portion on which the streamline structure is continued in the described embodiment. U.S. Pat. No. 4,776,535, issued on Oct. 11, 1988 to Paterson et al.; U.S. Pat. No. 4,789,117, issued on Dec. 6, 1988 to Paterson et al; and U.S. Pat. No. 4,813,633 issued on Mar. 21, 1989 to Werle et al. describe a wave-like structure in the sides and top of the rear of a tractor-trailer and in the trailing edge of an airfoil which results in reduced drag. U.S. Pat. No. 2,800,291, issued on July 23, 1957 to Stephens, and U.S. Pat. No. 2,899,150, issued on Aug. 11, 1959 to Ellis, Jr., describe structure in an airfoil which prevents turbulence. U.S. Pat. No. 4,861,093, issued on Aug. 29, 1989 to Chapman, describes a structure in the rear surface of a motor vehicle which minimizes turbulence along the rear surface by permitting a flow of air "through" the rear surface. Russian Pat. No. 927,616, issued May 15, 1982, and U.S. Pat. No. 4,682,808, issued on July 28, 1987 to Bilanin, describe the panel configurations suitable for mounting on the rear of a tractor-trailer which result in the reduction of drag. The flat panels can be positioned along the rear surface for convenient storage when not required.

The structures described by the foregoing references, those references which are applicable to tractor-trailers or other motor vehicles having a large and generally flat rear surface, are generally so large in extent that they must be stored when access to the interior of the motor vehicle is required. These structures also can provide and appreciable contribution to the overall length of the motor vehicle.

A need has therefore been felt for a structure associated with the rear surface of a motor vehicle, such as a van or tractor-trailer, which can provide drag reduction while still permitting convenient access to the interior of the vehicle and without requiring storage of the structure during such access.

FEATURES OF THE INVENTION

It is a object of the present invention to provide an improved motor vehicle.

It is a feature of the present invention to provide a motor vehicle with structure which results in drag reduction.

It is another feature of the present invention to provide structure on the rear surface of a motor vehicle which results in drag reduction.

It is a more particular feature of the present invention to provide structure on the rear surface of a tractor-trailer which results in drag reduction.

SUMMARY OF THE INVENTION

The aforementioned and other features are attained, according to the present invention, by providing the rear panel or door surface of a motor vehicle with structure that results in the reduction of drag for the vehicle. In the preferred embodiment, the rear surface has formed therein a plurality of cavity structures. According to one implementation, the cavity structures are circular in shape with limited extension into the rear surface, however, other cavity structures can be used. In addition, protruding structures, extending from the rear surface, can be used to provide drag reduction. The plurality of structures can be implemented to permit convenient access into the interior of the motor vehicle and will not complicate the operation of the doors.

These and other features of the invention will be understood upon reading of the following description along with the drawings.

DESCRIPTION OF THE PREFERRED EMBODIMENT

1. Detailed Description of the Figures

Figure 1:
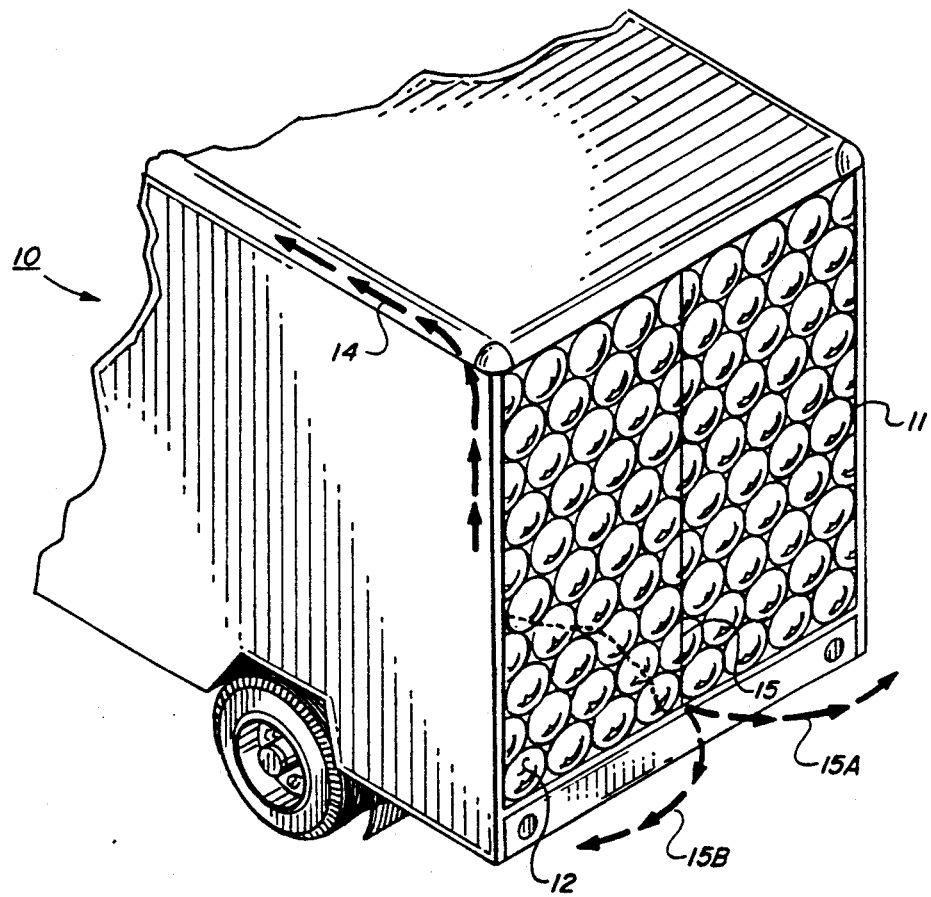
FIG. 1 is a perspective view of the rear surface of a tractor-trailer or van type motor vehicle indicating the structure fabricated therewith.
Figure 2:
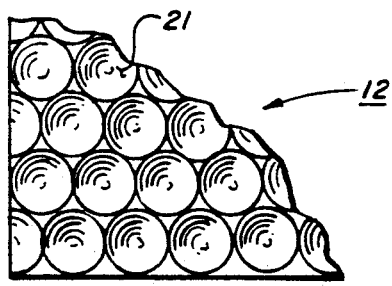
FIG. 2 shows a portion of the rear surface of a motor vehicle of the present invention wherein the structure fabricated therewith is implemented using circular cavities.

Referring now to FIG. 1, the rear panel or door surface of a motor vehicle having a rear surface capable of advantageously using the present invention is shown. The rear portion 10 of a tractor-trailer or a van has a rear surface 11 with which the structure of the present invention is associated. Section 12 of the rear surface 11 is shown enlarged in FIG. 2. The rear surface structure includes a multiplicity of cavities 21 (in FIG. 2) having a circular geometry. The circular cavities can have a wide range of dimensions. In the preferred embodiment, the radius of the opening of the cavity can be between 6 inches and 18 inches with the depth of the cavity being only a few inches. The foregoing dimensions are provided for illustration purposes and cavities having dimensions exceeding the exemplary dimensions can be used to provide drag reduction.

Referring once again to FIG. 1, the line 15 indicates where, when the rear surface of the motor vehicle is enclosed by doors, the doors meet when closed. The arrows 15A and 15B indicate the motion of the doors as they are opened. For many van type and tractor-trailer type motor vehicles, the rear panel can be raised by sliding the rear panel under the roof of the motor vehicle as indicated by arrow 14.

Figure 3:
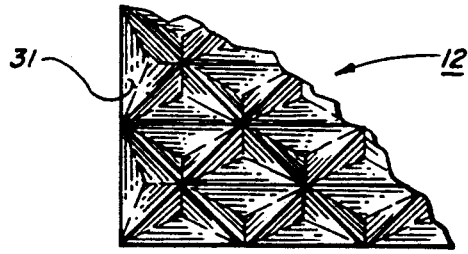
FIG. 3 shows a portion of the rear surface of a motor vehicle of the present invention wherein the structure fabricated therewith is implemented using triangular cavities.

Referring to FIG. 3, another configuration for the rear panel motor vehicle structure is shown. The structure is comprised of a multiplicity of triangular shaped cavities 31. In the preferred embodiment of this configuration, the base length of the triangle can be 18 inches in length while the sides of the triangle can be 12 inches in length. The depth of the triangles is typically a few inches. However, the reduction in drag as a result of this configuration of cavities can be achieved for a large range of dimensions.

Figure 4:
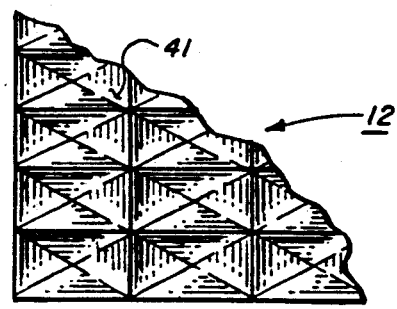
FIG. 4 shows a portion of the rear surface of a motor vehicle of the present invention wherein the structure fabricated therewith is implemented using rectangular cavities.

Referring to FIG. 4, the cavities 41 implementing the present invention are configured in the shape of rectangles. The linear dimensions of the rectangles are in the general range of 1 foot in length and a similar dimension in width. The depth of the cavity is generally a few inches.

Figure 5:
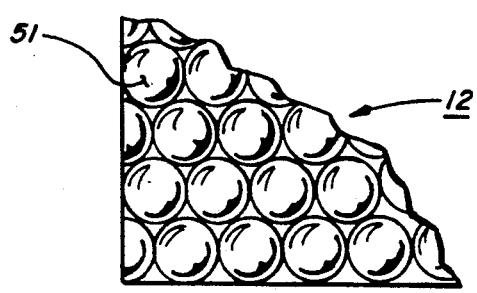
FIG. 5 shows a portion of the rear surface of a motor vehicle of the present invention wherein the structure fabricated therewith is implemented using circular projections.

Referring to FIG. 5, a different type of structure for the van or tractor-trailer type rear panel is shown. In particular, instead of cavity elements in the rear panel structure, the elements are comprised of protruding elements. In this embodiment, the protruding elements are circular and can have roughly the same dimensions as the circular cavities with the exception that the height dimension is approximately equal to the depth dimension of the cavities, but extends in the opposite direction from the rear surface. As will be clear, the circular configuration for the protruding structures can be replaced by geometries, inter alia, similar to the cavity structures of FIG. 3 and FIG. 4. In general, it has been found that the protruding structures are not as effective as the cavity structures.

2. Operation of the Preferred Embodiment

The use of the multiplicity of structures, whether cavity structures or protruding structures, have been found to reduce appreciably the drag experienced by the motor vehicle apparently due to turbulence at the rear of the motor vehicle. While the effect of the differences of the structure geometry is hard to quantify, general comments can be made. The structure elements typically have linear dimensions which can be approximately 1 foot in the plane of the rear panel. This general dimension permits a multiplicity of structure elements along each edge of the rear panel. The dimension in the range of a few inches. In addition, several structure elements should be as close as practical to the edge of the panel. In addition, the structure elements positioned on the interior of the rear panel are still effective to provide drag reduction. The surface of the rear panel, to the extent possible, should be coplanar with the rear edges of the sides of the motor vehicle.

The relatively shallow depth of the cavity structures or the relatively low height of the protruding structures permits the structure to be incorporated directly in the rear panel. As indicated by the references; prior art structures typically had to be moved in order to permit access to the interior of the motor vehicle. In the present invention, even the sliding panel type door whose motion is indicated in FIG. 1 by arrow 14 can be relatively conveniently accommodated because of the relatively narrow depth (or height) of the structure array.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A method for reducing drag for a motor vehicle such as a van or a tractor-trailer, said method comprising the step of:
providing a rear panel of said motor vehicle with a multiplicity of structure elements, each edge of said rear panel having selected structure elements positioned proximate thereto, wherein said structure elements extending a few inches from a plane of said rear panel.

2. The method of claim 1 wherein said providing step includes a step of fabricating said structure elements as cavities in said rear plane.

3. The method of claim 1 wherein said providing step includes a step of fabricating said structure elements as projections from said rear plane.

4. The method of claim 2 wherein said providing step includes a step of fabricating said structure elements with a circular geometry.

5. The method of claim 2 wherein said providing step includes a step of fabricating said structure elements with L triangular geometry.

6. The method of claim 2 wherein said providing step includes a step of fabricating said structure elements with a generally rectangular geometry.

7. Apparatus for providing drag reduction for a motor vehicle such as a van, tractor-trailer, or the like; said motor vehicle including a rear panel assembly, said apparatus comprising:
a multiplicity of structure elements forming a part of said assembly, wherein a first multiplicity of said structure elements are positioned proximate a first edge of said assembly, a second multiplicity of said structure elements being positioned proximate a second edge of said assembly, a third multiplicity of said structure elements being positioned proximate a third edge of said assembly, said structure elements extending into or extending from a surface of said rear panel by less than 7 inches.

8. The apparatus of claim 7 wherein said structure elements have dimensions in the plane of the rear assembly of between 6 and 18 inches.

9. The apparatus of claim 8 wherein said structure elements include circular cavities.

10. The apparatus of claim 8 wherein said structure elements include triangular cavities.

11. The apparatus of claim 8 wherein said structure elements include rectangular cavities.

12. The apparatus of claim 8 wherein said structure elements include circular projections.

13. A method for reducing drag of a motor vehicle such as a tractor-trailer or a van, said method comprising the steps of:
distributing structure elements on a rear panel of said motor vehicle, said structure elements having a dimension perpendicular to said rear panel of less than six inches; and positioning multiplicities of said structure elements proximate at least three edges of said rear panel.

14. The method for reducing drag of claim 13 further comprising a step of:

fabricating said structure elements with dimensions between 6 inches and 18 inches for dimensions parallel to said rear panel.

15. The method for reducing drag of claim 14 wherein said fabricating step includes a step of fabricating said structural elements to have cavities with a circular geometry.

16. The method for reducing drag of claim 14 wherein said fabricating step includes a step of fabricating said structural elements to have projections with a circular geometry.

17. The method for reducing drag of claim 14 wherein said fabricating step includes a step of fabricating said structural elements to have cavities with geometries selected from a group consisting of a triangular geometry and a rectangular geometry.

* * * * *

UNITED STATES PATENT AND TRADEMARK OFFICE
CERTIFICATE OF CORRECTION

PATENT NO. : 5,108,145

DATED : April 28, 1992

INVENTOR(S) : B.Waylon Harris

It is certified that error appears in the above-identified patent and that said Letters Patent is hereby corrected as shown below:

Column 4, Claim 5, line 35, should read:

---with a triangular geometry.---

Signed and Sealed this

Twenty-second Day of June, 1993

Attest:

MICHAEL K. KIRK

*Attesting Officer*  Acting Commissioner of Patents and Trademarks